Oct. 27, 1942. O. H. YOXSIMER Re. 22,214

REFRIGERATION APPARATUS

Original Filed Jan. 12, 1939 2 Sheets-Sheet 1

INVENTOR
ORLAND H. YOXSIMER.
BY W. A. Steiger
ATTORNEY

Oct. 27, 1942. O. H. YOXSIMER Re. 22,214

REFRIGERATION APPARATUS

Original Filed Jan. 12, 1939 2 Sheets-Sheet 2

WITNESSES:

W. M. Van Sciver

E. H. Lutz

INVENTOR

ORLAND H. YOXSIMER

BY W. Attaway

ATTORNEY

Reissued Oct. 27, 1942 Re. 22,214

UNITED STATES PATENT OFFICE 22,214

REFRIGERATION APPARATUS

Orland H. Yoxsimer, Mansfield, Ohio, assignor to Westinghouse Electric & Manufacturing Company, East Pittsburgh, Pa., a corporation of Pennsylvania Original No. 2,213,155, dated August 27, 1940, Serial No. 250,530, January 12, 1939. Application for reissue May 29, 1941, Serial No. 395,829

12 Claims. (Cl. 220—9)

My invention relates to refrigeration apparatus, and particularly to an improved refrigerator cabinet construction.

It is an object of my invention to provide an improved construction for one of the shells of a refrigerator cabinet of the type formed of inner and outer metal shells with heat insulation therebetween.

It is another object of my invention to improve the shell construction of a refrigerator cabinet to provide for attachment of a breaker strip at the cabinet door opening, without the use of nails or screws.

It is still another object of my invention to provide an improved seal for the door of a refrigerator cabinet and particularly of a refrigerator cabinet of the type wherein the door is flush with the side walls of the refrigerator cabinet, or with the side and top walls thereof.

It is a further object of my invention to provide an improved refrigerator cabinet construction and assembly of the type wherein the breaker strips between the inner and outer shell of the cabinet are coplanar with the front wall thereof and more particularly of the type wherein the cabinet door extends to the side walls of the cabinet and overlaps the coplanar breaker strips.

It is still a further object of my invention to provide an exceptionally rigid cabinet shell construction which facilitates handling and is of sufficient rigidity to support the cabinet door and to absorb the shocks of slamming when the door is closed.

It is also an object of my invention to provide an outer shell construction for a refrigerator cabinet which is formed of a single sheet of metal bent to provide top and side walls and wherein welding is dispensed with at the bends.

It is another object of my invention to provide a cabinet construction in which the breaker strips are coplanar with the front wall of the cabinet and wherein the space between the inner surfaces of the door and the breaker strips is minimized to prevent heat leakage and is so arranged that contact between them is prevented.

These and other objects are effected by my invention as will be apparent from the following description and claims taken in accordance with the accompanying drawings, forming a part of this application, in which:

Figure 1:
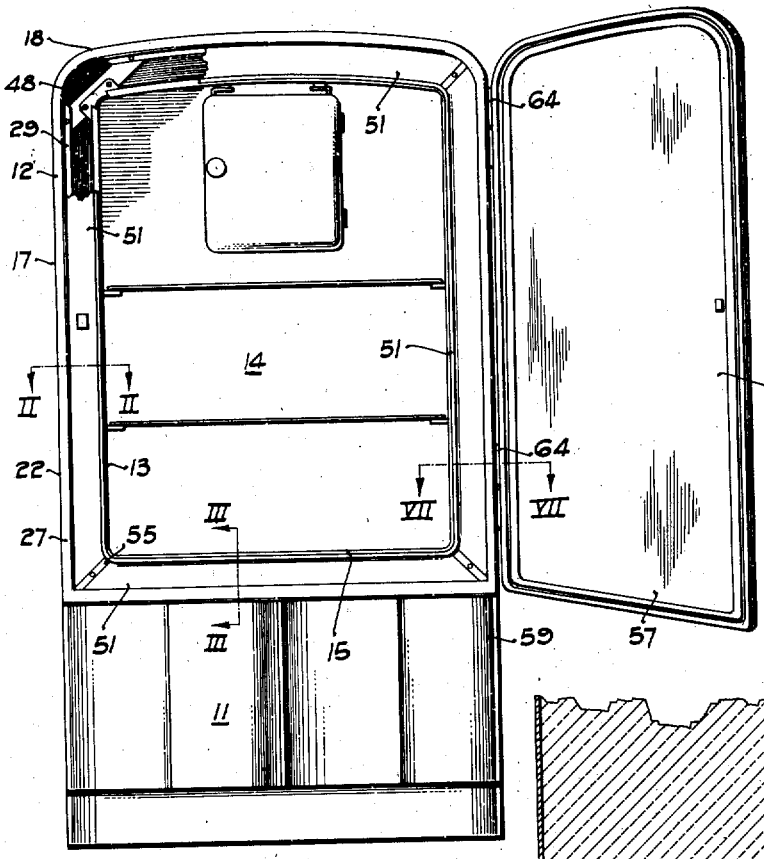
Fig. 1 is a front elevational view of a refrigerator cabinet embodying my invention.
Figure 2:
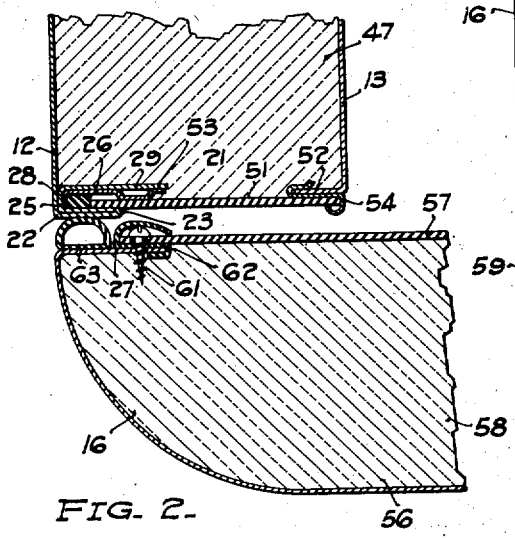
Fig. 2 is a sectional view taken on line II—II of Fig. 1 with the cabinet door closed.

Refering specifically to the drawings for a detailed description of my invention, numeral 11 designates generally a refrigerator cabinet having an outer shell 12 and an inner shell or food liner 13 defining a food storage compartment 14. The food storage compartment 14 is provided with an access opening 15 in the front thereof and a door generally indicated at 16 closes the access opening.

Figure 4:
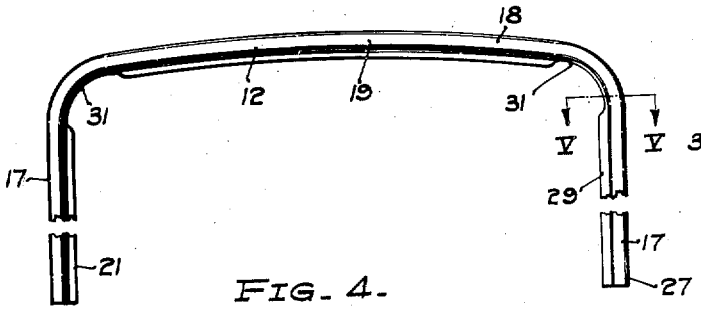
Fig. 4 is a view of the outer shell of the refrigerator cabinet bent to its final form.
Figure 5:
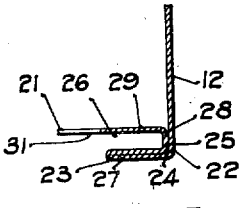
Fig. 5 is a sectional view taken on line V—V of Fig. 4.
Figure 6:
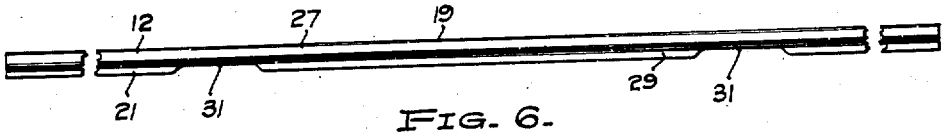
Fig. 6 is a view of the outer shell before it is bent.
Figure 7:
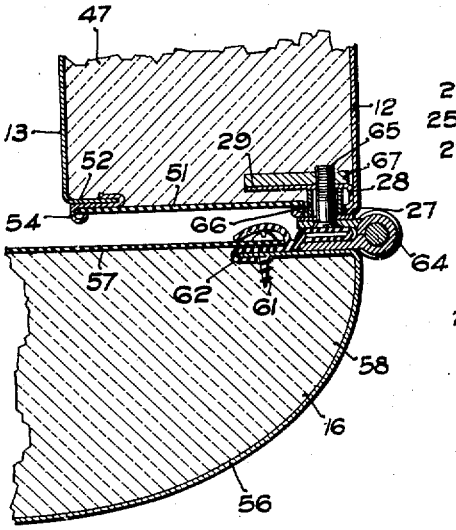
Fig. 7 is a detail sectional view taken on line VII—VII of Fig. 1, showing the cabinet door hinge support; and, Fig. 8 is a detail view of the construction of the outer shell at the corners where the side and bottom pockets formed on the outer shell are joined.

The outer shell 12 of the cabinet is preferably formed of metal and the top and side walls 17 and 18, respectively, are formed from a single sheet of metal 19, shown in Fig. 6, which is bent to U-shape, as shown in Fig. 4. The sides of the U form the side walls 17 and the bottom of the U forms the top wall 18 of the cabinet. A rear wall (not shown) is attached to the side and top walls in any suitable manner.

Before the sheet of metal 19 is bent to U-shape, one edge 21 thereof, which later forms the front edge of the side and top walls 17 and 18 of the cabinet, is formed into the shape best shown in Figs. 4 to 6 and 8, in the following manner. The edge 21 of the sheet 19 is first bent at right angles to the remainder of the sheet, as shown at 22. The sheet is then bent back on itself, as shown at 23, and is then again bent at right angles, as shown at 24, and extends parallel to the side and top walls for an appreciable distance. The sheet is again bent at right angles, as shown at 25, and extends parallel to the first bent portion, so that a generally U-shaped pocket 26 is formed in which one side of the U forms a front flange or wall member 27, the bottom of the U forms the bottom 28 of the pocket and the other side of the U forms an inner flange 29. The inner flange 29 is cut away, at 31, either before or after forming the pocket 26 to facilitate bending the sheet into the inverted U-shape shown in Fig. 4. The radii of the upper corners of the cabinet is such that with the cut-aways 31, the metal does not crack or require slitting and does not require welding after bending.

The first advantage which is effected by bending the edge of the sheet 19 in the shape shown is that considerable stiffness is imparted thereto, which facilitates handling of the sheet during the remainder of the forming and assembly operations.

Figure 3:
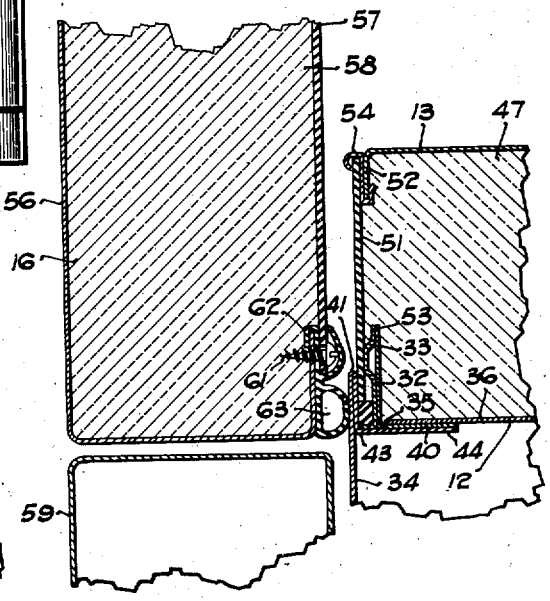
Fig. 3 is a similar sectional view taken on line III—III of Fig. 1.
Figure 8:
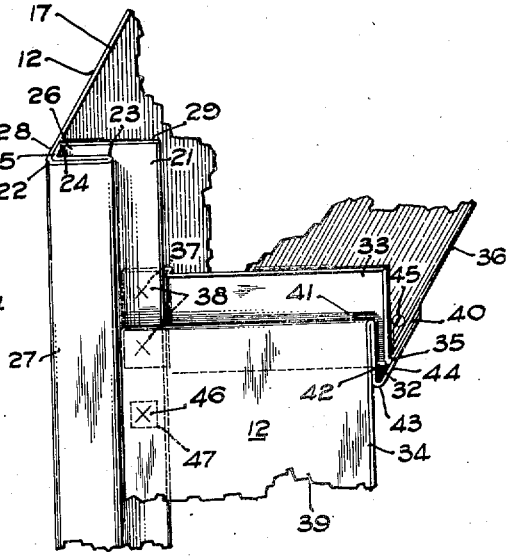

After the sheet 19 is bent to the form shown in Fig. 4, a U-shaped pocket 32 is formed intermediate of the top and bottom of the refrigerator cabinet 11, as best shown in Figs. 3 and 8. The pocket 32 is formed by sheets of metal 33 and 34. The sheet 33 is bent at right angles, at 35, so that a flange 40 is formed to support a bottom wall 36 spaced from the food liner and a flange 37 is formed which is welded, at 38, to the inner flange 29 of the U-shaped pocket 26. The sheet 34 provides a portion 39 of the outer shell 12 of the cabinet and extends upwardly to a point below the edge of the flange 37 of the sheet 33, where it is then bent back upon itself, at 41, extends approximately to the level of the bend 35 on sheet 33, as shown at 42, and is then bent at right angles, at 43, and forms a flange 44 extending under the bottom wall 36 to assist flange 40 in supporting the wall 36. The flanges 40 and 44 and wall 36 may be connected together by screws 45. The sheet 34 is welded to the flange 29, at 46, a metal spacer 47 is being provided therebetween.

After the sheet 19 is bent to U-shape and the pocket 32 and bottom wall 36 are completed, the food liner 13 is inserted within the outer shell 12 and heat insulation 47 is disposed between the side and top walls 17 and 18 and the food liner and between the bottom wall 36 and the food liner. As shown in Fig. 1, the food liner 13 is also supported on the flange 29 by gussets 48, one of which is disposed at each corner of the food liner 13.

It is, therefore, to be noted that the pocket construction 26 supports the majority of the weight of the food liner 13 and heat insulation 47. The support for the food liner 13 by means of gussets 48 is fully disclosed and claimed in the copending application of Anthony A. Quimper, Serial No. 241,937, filed November 23, 1938, for Refrigeration apparatus, and assigned to the assignee of the present application.

Breaker strips 51, formed of four flat sheets of heat insulating material meeting at the corners of the food liner 13, are now attached to the cabinet 11. The food liner 13 extends outwardly to a point slightly in back of the plane of the front of the cabinet 11 and is provided with a flange 52 parallel to the front of the cabinet and extending toward the flange 27 on the outer shell 12. Resilient devices 53 are disposed in the pockets 26 and 32 and S-shaped metal strips 54 are disposed along one edge of the breaker strips 51. The opposite edge of the breaker strip is forced into the pockets 26 and 32 and the resilient devices 53 are compressed until the strips 54 may be snapped over the flange 52 of the food liner 13. The devices 53 retain the breaker strips 51 in place since they exert a force towards flange 52 and also toward flange 27 on the outer shell 12. Cover pieces 55 are provided at the corners of the food liner 13 to cover the meeting edges of the breaker strips 51.

The form of the pockets 26 and 32 therefore, provide for attaching the breaker strips 51 to the cabinet 11 without the use of nails or screws and also provide for disposition of the breaker strip in a plane parallel to the front of the cabinet 11. The construction and method of assembling the breaker strips 51 are fully disclosed in my copending application, Serial No. 244,765, filed December 9, 1938, for Refrigeration apparatus.

The door 16 for closing the food storage compartment 14 is formed of an outer door pan 56, preferably formed of metal and a flat inner sheet of relatively rigid heat insulating material 57 with heat insulation 58 therebetween. The flat inner sheet 57 does not extend into the food compartment 14 but its marginal edges extend to the side and top walls 17 and 18 of the cabinet 11. The bottom of the door extends closely adjacent to a panel 59 which is disposed in front of the sheet of metal 34 which partially forms the pocket 32 at the bottom of the food liner 13. The inner and outer shells of the door 16 are fastened together by screws 61 at the inner marginal edges thereof and a combined gasket and screw cover generally indicated at 62 is held in position by the screws 61. A gasket portion 63 is so positioned that it strikes the outer surface of the flange 27 and the doubled sheet 34 of the outer shell 12.

The flange 27 and doubled sheet 34 are sufficiently rigid because of their doubled construction to absorb the shocks of slamming the door, and as a result the breaker strips 51 are not damaged or dislodged. Furthermore, the surface of the flange 27 is closer to the inner sheet 57 of the door 16 than are the breaker strips 51 so that even if the gasket portion 63 fails the door will not strike the breaker strips. In addition, a long heat break and air space is provided between the seal made by the gasket portion 63 and the interior of the food liner 14, thus reducing heat leakage. The complete door 16 is disclosed and claimed in my copending application, Serial No. 238,365, filed November 2, 1938, for Refrigerator cabinet.

The door 16 is hung on hinges 64 and the hinges are attached to the flanges 27 and 29 of the U-shaped pocket 26 by means of a bolt 65. A spacer 66 and a backing plate 67 are provided to add rigidity to the hinge mounting but it is apparent that the outer shell construction 12 and particularly the form of the pocket 26 supports the entire weight of the door 16.

From the foregoing it will be apparent that I have provided a new and useful cabinet construction which is simple and inexpensive but which performs the heretofore enumerated functions, which functions are numerous and extremely desirable, particularly in a cabinet of the type wherein the metal walls of the cabinet are substantially self-supporting without the use of internal framework of metal, wood, or the like.

While I have shown my invention in but one form, it will be obvious to those skilled in the art that it is not so limited but is susceptible of various changes and modifications without departing from the spirit thereof, and I desire, therefore, that only such limitations shall be placed thereupon as are imposed by the prior art or as are specifically set forth in the appended claims.

What I claim is:

1. A refrigerator cabinet construction comprising inner and outer metal shells forming a food compartment and top, rear, side and front walls of said cabinet, said front wall being provided with a door opening therein, said shells being spaced apart peripherally of the door opening, a breaker strip connecting said shells at the door opening, said outer shell having a pocket formed thereon peripherally of the door opening for receiving one marginal edge of said breaker strip, said pocket at the top and sides of the door opening being formed by extending the metal of the outer shell toward the inner shell parallel to the front wall of the cabinet, said metal then being bent backwardly upon itself, then in a direction inwardly from the front wall for an appreciable distance and then parallel to the front wall again, said inner shell extending substantially to the plane of the front wall of the cabinet, so that the breaker strip extending between said shells is also substantially parallel to the front wall of the cabinet, a door for closing the access opening and a gasket cooperating with said cabinet and door for sealing the access opening and disposed between the exterior surface of said pocket and said door, said gasket and breaker strip being spaced from each other at all points when the door is closed.

2. A refrigerator cabinet construction comprising inner and outer metal shells forming a food compartment and top, rear, side and front walls of said cabinet, said front wall being provided with a door opening therein, said shells being spaced apart peripherally of the door opening, a breaker strip connecting said shells at the door opening, said outer shell having a pocket formed thereon peripherally of the door opening for receiving one marginal edge of said breaker strip, said pocket at the top and sides of the door opening being formed by extending the metal of the outer shell toward the inner shell parallel to the front wall of the cabinet, said metal then being bent backwardly upon itself, then in a direction inwardly from the front wall for an appreciable distance and then parallel to the front wall again, said inner shell extending substantially to the plane of the front wall of the cabinet, so that the breaker strip extending between said shells is also substantially parallel to the front wall of the cabinet, the exterior faces of said pocket defining a portion of the outer boundary of the front wall of the cabinet, a door for closing the access opening, which door is coextensive with those portions of the outer boundary of said front wall which are defined by the exterior faces of said pocket and a gasket engaging with the exterior faces of said pocket and with the inner periphery of said door, said gasket and breaker strip being spaced from each other at all points when the door is closed for sealing the access opening.

3. A refrigerator cabinet construction comprising inner and outer shells having a door opening formed therein, said shells having edge portions peripherally of the door opening, the metal of the edge portion of the outer shell being bent to form inwardly facing grooves substantially throughout the periphery of the door opening, said grooves at the top and sides of the door opening being formed with said edge portion of the outer shell having a portion bent at right angles to the outer shell, then back upon itself inwardly thereof and contacting said right angle bent portion substantially throughout its surface to form a flange of double thickness, said edge portion then having a portion bent inwardly at right angles to the flange of double thickness and in contact with said outer shell, and said edge portion then having a portion bent inwardly at right angles to said last-named portion and terminating in spaced relation to said inner shell.

4. A refrigerator cabinet construction comprising inner and outer shells having a door opening formed therein, said outer shell being bent to substantially U-shape to form the top and side walls of the refrigerator cabinet, said shells having edge portions peripherally of the door opening, the metal of the edge portion of the outer shell being bent to form inwardly facing grooves substantially throughout the periphery of the door opening and around the curves of said U-shape, said grooves at the top and sides of the door opening being formed with said edge portion of the outer shell having a portion bent at right angles to the outer shell, then back upon itself inwardly thereof and contacting said right angle bent portion substantially throughout its surface to form a flange of double thickness, said edge portion then having a portion bent inwardly at right angles to the flange of double thickness and in contact with said outer shell, and said edge portion then having a portion bent inwardly at right angles to said last-named portion and terminating in spaced relation to said inner shell.

5. A refrigerator cabinet construction as set forth in claim 4 wherein the last-mentioned bent portion is of less extent at the curves of said U-shaped outer shell.

6. A refrigerator cabinet construction as set forth in claim 4 wherein the last-mentioned bent portion is cut back at the corners of said U-shaped outer shell.

7. A refrigerator cabinet construction comprising inner and outer shells having a door opening formed therein, said shells having edge portions peripherally of the door opening, the metal of the edge portion of the outer shell being bent to form inwardly facing grooves substantially throughout the periphery of the door opening, said grooves at the top and sides of the door opening being formed with said edge portion of the outer shell having a portion bent at right angles to the outer shell, then back upon itself inwardly thereof and contacting said right angle bent portion substantially throughout its surface to form a flange of double thickness, said edge portion then having a portion bent inwardly at right angles to the flange of double thickness and in contact with said outer shell, and said edge portion then having a portion bent inwardly at right angles to said last-named portion and terminating in spaced relation to said inner shell, said inner shell having parallel flanges extending substantially peripherally of its edge portion and in substantially the same plane as said flange of double thickness, and a breaker strip extending into said grooves and being secured to the flanges of said inner shell.

8. A refrigerator cabinet construction comprising inner and outer shells having a door opening formed therein, said shells having edge portions peripherally of the door opening, the metal of the edge portion of the outer shell being bent to form inwardly-facing grooves substantially throughout the periphery of the door opening, said grooves at the top and sides of the door opening being formed with said edge portion of the outer shell having a portion bent at right angles to the outer shell, then back upon itself inwardly thereof and contacting said right angle bent portion substantially throughout its surface to form a flange of double thickness, said edge portion then having a portion bent inwardly at right angles to the flange of double thickness and in contact with said outer shell, and said edge portion then having a portion bent inwardly at right angles to said last-named portion and terminating in spaced relation to said inner shell, said inner shell having parallel flanges extending substantially peripherally of its edge portion and in substantially the same plane as said flange of double thickness, a breaker strip extending into said grooves and being secured to the flanges of said inner shell, and a door for closing said door opening, said door being provided with a door gasket positioned to seat on the exterior surface of the flange of double thickness.

9. A refrigerator cabinet construction comprising inner and outer shells having a door opening formed therein, said shells having edge portions peripherally of the door opening, the metal of the edge portion of the outer shell being bent to form inwardly-facing grooves substantially throughout the periphery of the door opening, said grooves at the top and sides of the door opening being formed with said edge portion of the outer shell having a portion bent at right angles to the outer shell, then back upon itself inwardly thereof and contacting said right angle bent portion substantially throughout its surface to form a flange of double thickness, said edge portion then having a portion bent inwardly at right angles to the flange of double thickness and in contact with said outer shell, and said edge portion then having a portion bent inwardly at right angles to said last-named portion and terminating in spaced relation to said inner shell, said inner shell having parallel flanges extending substantially peripherally of its edge portion and in substantially the same plane as said flange of double thickness, a breaker strip extending into said grooves and being secured to the flanges of said inner shell, and a door for closing said door opening, said door being provided with a door gasket positioned to seat on the exterior surface of the flange of double thickness, said exterior surface of the flange of double thickness extending outwardly of the front wall of the cabinet a greater distance than said breaker strip or flange on said outer shell.

10. A refrigerator cabinet construction comprising inner and outer shells having a door opening formed therein, said shells having edge portions peripherally of the door opening, the metal of the edge portion of the outer shell being bent to form inwardly facing grooves substantially throughout the periphery of the door opening, said grooves at the top and sides of the door opening being formed with said edge portion of the outer shell having a portion bent at right angles to the outer shell, then back upon itself inwardly thereof and contacting said right angle bent portion substantially throughout its surface to form a flange of double thickness, said edge portion then having a portion bent inwardly at right angles to the flange of double thickness and in contact with said outer shell, and said edge portion then having a portion bent inwardly at right angles to said last-named portion and terminating in spaced relation to said inner shell, said inner shell having parallel flanges extending substantially peripherally of its edge portion and substantially parallel to said flange of double thickness, and a substantially flat-faced breaker strip extending parallel to the plane of the door opening and being secured in said grooves in the outer shell and to said flanges on the inner shell.

11. A refrigerator cabinet construction comprising inner and outer shells having a door opening formed therein, said shells having edge portions peripherally of the door opening, the metal of the edge portion of the outer shell being bent to form inwardly-facing grooves substantially throughout the periphery of the door opening, said grooves at the top and sides of the door opening being formed with the edge portion of the outer shell having a substantially flat portion bent at right angles to the outer shell, then bent inwardly and reversely thereof parallel and closely adjacent to said right angle bent portion to form therewith a substantially solid flange, said edge portion then having a portion bent inwardly at right angles to said flange and parallel and closely adjacent to said outer shell to form therewith a solid reinforced wall portion, and said edge portion then having a portion bent inwardly at right angles to said last-named portion and terminating in spaced relation to said inner shell.

12. In a refrigerator cabinet having vertical front and side walls, the combination of inner and outer shells with heat insulation therebetween, said inner shell defining a food-storage compartment having an access opening in the front thereof, said outer shell having a concentric opening in the front thereof, a flange on said inner shell extending toward the outer shell peripherally of the access opening, a flange on the outer shell extending towards said inner shell peripherally of said concentric opening and substantially parallel to the plane of the front wall of the cabinet, a breaker strip extending between said flanges and embodying an exposed faced portion and edged portions, one of said edge portions being entirely disposed at the rear of the flange on the outer shell and the other of said edge portions being disposed entirely in front of the flange on said inner shell, means for securing the respective edges of the breaker strip to the inner and outer shells, a substantial portion of the breaker strip being disposed substantially parallel to the plane of the front wall of the cabinet, the exposed portions of the flange on the outer shell being relatively narrow compared to the exposed surfaces of said breaker strip, a door for closing the access opening and a gasket disposed between said door and the outer surface of said flange on the outer shell when the door is closed, said gasket being substantially coextensive in cross section with the entire exposed surface of said flange on the outer shell and providing the sole sealing means between said door and the remainder of said cabinet.

ORLAND H. YOXSIMER.